United States Patent
Lim et al.

(10) Patent No.: US 12,451,246 B2
(45) Date of Patent: Oct. 21, 2025

(54) AUTOMATED TRIGGERS FOR ELECTROPHYSIOLOGY CASE SUPPORT

(71) Applicant: CARDIOINSIGHT TECHNOLOGIES INC., Independence, OH (US)

(72) Inventors: Hae Won Lim, Blain, MN (US); Gregory Scott Brumfield, Delaware, OH (US); William E. Rowland, Ball Ground, GA (US); Qingguo Zeng, Solon, OH (US); Qing Lou, Solon, OH (US); David A. Simon, Boulder, CO (US); Timothy G. Laske, Shoreview, MN (US)

(73) Assignee: CARDIOINSIGHT TECHNOLOGIES INC., Independence, OH (US)

( * ) Notice: Subject to any disclaimer, the term of this patent is extended or adjusted under 35 U.S.C. 154(b) by 397 days.

(21) Appl. No.: 17/986,473

(22) Filed: Nov. 14, 2022

(65) Prior Publication Data
US 2023/0162854 A1    May 25, 2023

Related U.S. Application Data

(60) Provisional application No. 63/281,310, filed on Nov. 19, 2021.

(51) Int. Cl.
*G16H 40/67*      (2018.01)
*A61B 5/00*       (2006.01)
(Continued)

(52) U.S. Cl.
CPC .......... *G16H 40/67* (2018.01); *A61B 5/0006* (2013.01); *A61B 5/333* (2021.01); *A61B 5/353* (2021.01); *A61B 5/367* (2021.01)

(58) Field of Classification Search
CPC ........ G16H 40/67; A61B 5/353; A61B 5/333; A61B 5/367
(Continued)

(56) References Cited

U.S. PATENT DOCUMENTS 10,468,131 B2    11/2019    Macoviak et al.
10,603,792 B2    3/2020     Lai et al.
(Continued)

FOREIGN PATENT DOCUMENTS

CN    111513855 A    8/2020

OTHER PUBLICATIONS

Sotiris Avgousti, et al. "Medical telerobotic systems: current status and future trends." Biomedical engineering online 15.1 (2016): 1-44; https://doi.org/10.1186/s12938-016-0217-7.
(Continued)

*Primary Examiner* — Nadia A Mahmood
(74) *Attorney, Agent, or Firm* — Tarolli, Sundheim, Covell &Tummino LLP

(57) ABSTRACT

One or more non-transitory machine-readable media to store data and instructions executable by one or more processors. The instructions are programmed to analyze workflow data for a given phase of a plurality of phases of an ongoing electrophysiology (EP) workflow implemented using a first computing apparatus. The instructions can also determine at least one support event based on the analysis of the workflow data and send a request to at least one remote support specialist responsive to determining the at least one support event. The instructions further can establish a communication link between the first computing apparatus and a second computing apparatus, which is associated with a respective remote support specialist, and enable user interaction with and control of the machine-readable EP workflow instructions on the first computing apparatus responsive to a user
(Continued)

input by the respective remote support specialist at the second computing apparatus.

35 Claims, 4 Drawing Sheets

(51) Int. Cl.
  *A61B 5/333* (2021.01)
  *A61B 5/353* (2021.01)
  *A61B 5/367* (2021.01)
(58) Field of Classification Search
  USPC .......................................................... 600/523
  See application file for complete search history.

(56) References Cited

U.S. PATENT DOCUMENTS

| | | | | |
|---|---|---|---|---|
| 2008/0194950 | A1* | 8/2008 | Mejia | A61B 8/467 600/437 |
| 2018/0189452 | A1 | 7/2018 | Serhani et al. | |

OTHER PUBLICATIONS

Song, Xiping, Minmin Han, and Thomas Thiery. "Representing and handling workflow exceptions in highly dynamic healthcare environments." International Journal Of Intelligent Control and Systems 12.1 (2007): 2-14.

Lakkireddy, Dhanunjaya R., et al. "Guidance for cardiac electrophysiology during the COVID-19 pandemic from the Heart Rhythm Society COVID-19 Task Force; electrophysiology section of the American College of Cardiology; and the Electrocardiogramd Arrhythmias Committee of the Council on Clinical Cardiology, American Heart Association." Circulation 141.21 (2020): e823-e831.

Young, Heather M., and Thomas S. Nesbitt. "Increasing the capacity of primary care through enabling technology." Journal of general internal medicine 32 (2017): 398-403.

Raison, Nicholas, Muhammad Shamim Khan, and Ben Challacombe. "Telemedicine in surgery: what are the opportunities and hurdles to realising the potential?." Current urology reports 16 (2015): 1-8.

Paul Licari; "How to remote control my office computer using Microsoft Teams?"; Jun. 25, 2021, XP093024547, Retrieved from the Internet: URL:https://web.archive.org/web/20210625130648/ https://blog.nettconn.net/how-to-remote-control-my-office-computer-using-microsoft-teams [retrieved on Feb. 16, 2023], p. 2.

Applicant: Cardioinsight Technologies Inc.; "Automated Triggers for Electrophysiology Case Support"; International Application No. PCT/US2022/050247; PCT International Search Report and Written Opinion dated Feb. 28, 2023; 14 pgs.

* cited by examiner

AUTOMATED TRIGGERS FOR ELECTROPHYSIOLOGY CASE SUPPORT

CROSS REFERENCE TO RELATED APPLICATION

This application claims the benefit of U.S. Provisional Patent Application No. 63/281,310, filed 19 Nov. 2021, which is incorporated herein by reference in its entirety.

FIELD

The present technology is generally related to automated triggers for case support that can occur during electrophysiology procedures.

BACKGROUND

Electrophysiology procedures are used to analyze, diagnose and/or treat cardiac electrical activities. Electrophysiology procedures usually take place in an electrophysiology (EP) lab or a catheterization (Cath) lab at a hospital or other medical facility. For example, an EP mapping procedure can be performed in an invasive procedure in which one or more electrode catheters are placed in or on the heart to measure electrophysiology signals. In an additional or alternative example, the EP mapping procedure may be performed using a non-invasive arrangement of electrodes distributed across an outer surface of the patient's body (e.g., on the thorax). In some cases, a clinical specialist may be present to provide guidance and technical support before, during, and/or after the EP procedure. The use of clinical specialists at the site of an EP procedure can result in significant expense due to salaries and travel and often is an inefficient use of the mapping specialist's time, especially in simple cases or when a case is canceled.

SUMMARY

The techniques of this disclosure generally relate to systems and methods for implementing automated triggers for case support during electrophysiology procedures.

In one aspect, the present disclosure provides one or more non-transitory machine-readable media to store data and instructions executable by one or more processors. The instructions are programmed to analyze workflow data for a given phase of a plurality of phases of an ongoing electrophysiology (EP) workflow implemented using a first computing apparatus. The instructions can also determine at least one support event based on the analysis of the workflow data and send a request to at least one remote support specialist responsive to determining the at least one support event. The instructions further can establish a communication link between the first computing apparatus and a second computing apparatus, which is associated with a respective remote support specialist, and enable user interaction with and control of the machine-readable EP workflow instructions on the first computing apparatus responsive to a user input by the respective remote support specialist at the second computing apparatus.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
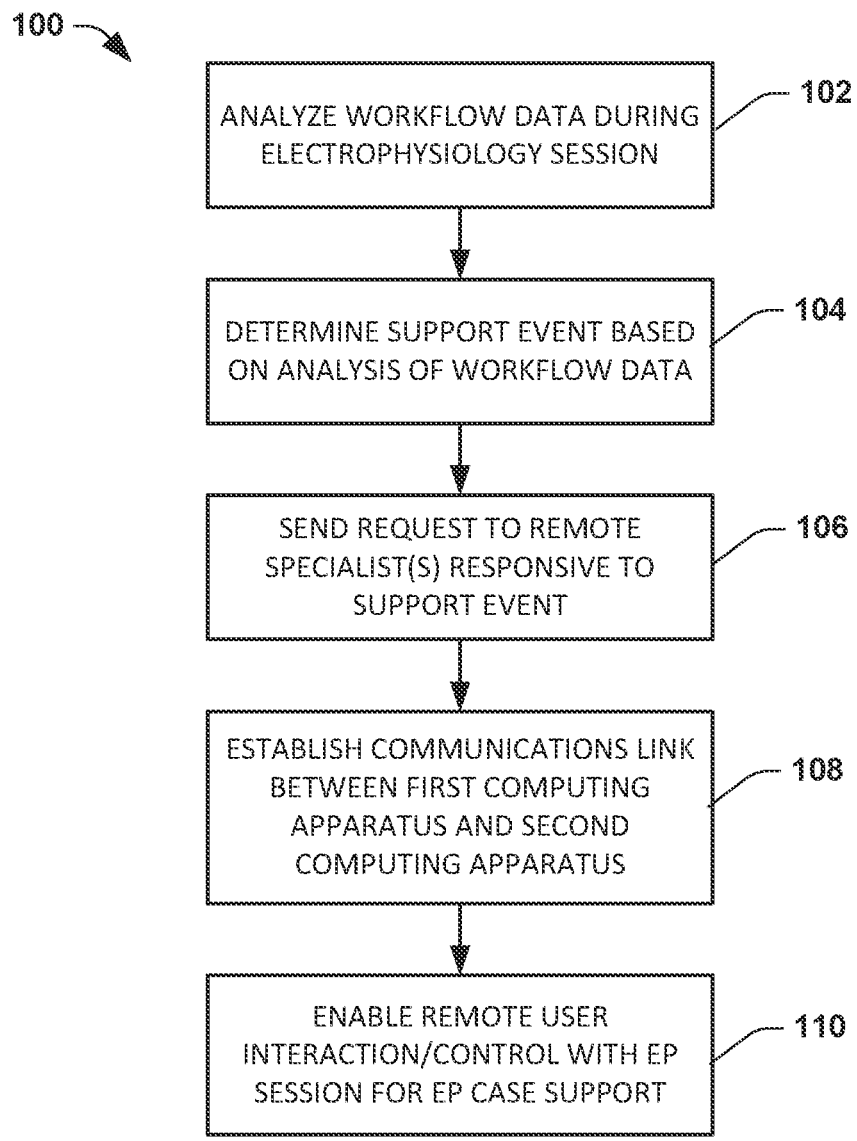
FIG. 1 is a flow diagram that illustrates a method for triggering remote support for an electrophysiology encounter.

This disclosure relates to systems and methods to automate triggers that can occur during electrophysiology (EP) procedures to implement case support by a remote specialist. As an example, a computing apparatus (e.g., and EP computer workstation) can store workflow data pertaining to an ongoing electrophysiology (EP) workflow session. The EP workflow session can have a plurality of phases, such as a pre-procedure phase and an intraprocedure (e.g., mapping and analysis) phase. The pre-procedure phase can involve electrodes being applied to the patient for measuring EP signals and geometry data being generated (e.g., from imaging or other geometry generating mechanism) to enable reconstruction of EP signals on a surface of interest. The intraprocedure phase can involve acquiring and processing of measured EP signals, selecting signals of interest and generating one or more EP maps on the surface of interest.

Systems and methods disclosed herein can be configured to implement automated triggers for support by a remote support specialist. For example, one or more support events can be determined based on an analysis of the workflow data for a given phase of the plurality of phases. The workflow data can relate to a user condition (e.g., stress level, body temperature or the like), user actions (e.g., user performing illogical steps, physiological changes in the patient (e.g., unexpected rhythm change or a change to a rhythm type related to a condition in which the user is not an expert.

The determination of a given support event can be used as a trigger for issuing a request for a remote support specialist. In response to determining such a support event, a request (e.g., a notification or message) can be sent to one or more remote support specialists responsive to detecting the support event. The request can be sent to one or more remote support specialists in response to the support event depending on the workflow data and the phase of the EP workflow. The support event may be detected based on determining an exception, complexity or ambiguity from the workflow data.

In response to a respective remote support specialist responding to the request (e.g., accepting the request from a second computing apparatus), a communication link can be established between the first computing apparatus and the second computing apparatus. After the link has been established, the first computing apparatus can be configured to enable remote user interaction with and control of the machine-readable EP workflow instructions on the first computing apparatus responsive to user inputs by the respective remote support specialist at the second computing apparatus. For example, the control of the EP workflow instructions can be transferred from the local operator to the remote support specialist. The remote support specialist can remotely control EP workflow instructions on the first computing apparatus in response to user input data provided at the second computing apparatus, such as to execute an upcoming event in the EP workflow and/or for revise (or regenerate) previously generated workflow data. The types of controls that may be implemented can vary depending on the phase of the EP workflow as well as can be implemented at the discretion of the remote support specialist. After the remote specialist has implemented the controls deemed necessary, control can be returned to the local operator (e.g., in response to control transfer user input instruction).

A bidirectional video and/or audio connection can also be used (e.g., over the same or another communications link) to enable real-time verbal communication between the remote support specialist and the local operator. The bidirectional video and/or audio connection can be implemented independently from the remote control function, which is activated responsive to determining a support event. Alternatively, the bidirectional video and/or audio connection can be provided each time a support event is detected.

The systems and methods disclosed herein thus can reduce costs in the overall EP workflow session because a reduced number of mapping specialists may be used to service a greater number of EP workflow sessions without requiring travel. For example, a given remote specialist further can implement remote control from the second computing apparatus for multiple instances of EP workflow sessions running on respective computing apparatuses (e.g., for different patients), which remote control functions can be implemented concurrently or sequentially. Additionally, the approach described herein can enable worldwide assistance by connecting specific specialists having particular expertise relating to a situation or problem encountered.

FIG. 1 is a flow diagram that illustrates an example method 100 for implementing automated triggers for case support by a remote support specialist. While for purposes of simplicity of explanation, the example method of FIG. 1 is shown and described as executing serially, the example method 100 is not limited by the illustrated order, as some actions could in other examples occur in different orders, multiple times and/or concurrently from that shown and described herein. In an example, the method 100 is implemented as machine-readable instructions executed by a processor, such as by a computing apparatus (e.g., a local computer, a cloud-based computer or a computing apparatus that include hardware and/or software distributed between a local premise and a cloud computing architecture). As an example, the method 100 can be implemented by instructions being executed by one or more processors of a cardiac mapping system, such as the CardioInsight® mapping products (e.g., mapping vest and workstation) available from Medtronic of Minneapolis, MN USA. Further examples of cardiac mapping systems, which can implement the method 100 are disclosed in U.S. Pat. Nos. 8,478,393, 9,078,573, and 9,427,166, each of which is incorporated herein by reference. In other examples, other cardiac mapping systems can be programmed to implement the method 100 (e.g., the EnSite cardiac mapping system from Abbott or the CARTO system from Biosense Webster). That is, the systems and methods disclosed herein are applicable to nearly any form or configuration of EP mapping, recording or stimulation system.

At 102, the method 100 includes analyzing workflow data during an EP workflow session, such as workflow data for a given phase of the plurality of phases of the EP workflow session. As used herein, the workflow data can include any data relating to a given electrophysiology (EP) workflow session that is being implemented for a respective patient using a first computing apparatus (e.g., a local computer or workstation). For example, workflow data can include patient data (e.g., patient demographic information, health history information and the like), image data (e.g., 3D anatomical image of the patient, such as including an arrangement of sensors on the patient's thorax), geometry data (e.g., describing spatial relationship between a patient's body surface and a surface of interest) and electrophysiological data (e.g., EP signal measurements) for a patient. The workflow data can also relate to the user, such a user condition and/or user actions (or omissions). The workflow data can be obtained during the EP workflow session or prior to the workflow session, depending on the type of data and how it is acquired. For example, workflow data describing a user condition can be based on determining a level of user stress (e.g., above a stress threshold). Workflow data describing user actions the user performing illogical steps within the software (e.g., indicating confusion or lack of knowledge on how to operate the system). Additionally, the system can track and store information, as part of the workflow data, representative of an experience and/or expertise of users and specialists. Thus, the system can determine a support event based on workflow data indicate a user (or local specialist) is not an expert or otherwise lacks experience related a patient condition (e.g., unexpected rhythm change or a change to a rhythm type).

At 104, a support event is determined based on the analysis of the workflow data. The support event can represent any condition or part of the EP workflow session in response to which assistance from a remote specialist is to be requested. In an example, a given EP workflow session can include predetermined portions of the workflow session, each of which are represented by workflow status data indicating when such portion of the workflow is active or is expected to be active (e.g., it will be implemented next in the workflow). Certain portions of the workflow thus can be designated as requiring review and/or approval by a mapping specialist before proceeding to a next portion of the session, and a request (e.g., a notification) can be sent to obtain such approval from a remote specialist in response to detecting (based on the workflow status data specifying) when such portion of the workflow session is approaching or imminent. Another example of a portion of the workflow that can determine a support event is a final check of one or more maps or other generated EP data that is expected to be used to drive an intervention (e.g., treatment or therapy or implant). In addition, the system may allow the user to define which step or combination of steps will automatically generate a request for support based upon the expertise of the local team and/or user.

Support events further can also be determined from analysis of workflow data that includes EP information that is generated or derived during a respective phase in overall EP workflow session. As an example, in the pre-procedure phase, support events can include determining a need for assistance in anatomic segmentation of pre-procedure images in support of a given patient's case based on detecting an atypical anatomy for the patient (e.g., from image analysis or patient condition data). Additionally or alternatively, a confidence (e.g., a statistical value) can be computed with respect to the segmented image data, and a confidence value that is below a threshold value can specify a support event. In yet another example, a support event regarding image segmentation can be determined based on the image segmentation process taking an amount of time that exceeds a normal time period (e.g., which may be a statistical value or be an operator specific value). The pre-procedure phase can also determine support events associated with the improper placement and/or contact of sensors placed on the patient's body surface such as based on a determination of low channel integrity.

During the intra-procedure phase, support events can also be determined at 104 based on which one or more mapping functions the operator has invoked in response to a user input. For example, the operator data can specify a qualification (or experience) level with respect to each of the available mapping and analysis functions implemented by the computing apparatus. A support event thus can be determined at 104 in response to determining that the operator has selected a mapping or analysis function for which the operator has no experience or has an experience level that is below a threshold value.

As another example during the intra-procedure phase, a support event can be determined at 104 in response to determining that an electroanatomic map may be ambiguous (e.g., in which the map is determined to have a low confidence and/or incoherent portions). During the intra-procedure phase, for example, the method 100 can access stored electrophysiological data that is provided based on electrophysiological signals measured from a plurality of sensors positioned on an outer surface of the patient's body. Electrophysiological signals can be reconstructed on a surface of interest within the patient's body (e.g., by solving the inverse problem) based on the electrophysiological data and geometry data. Examples of inverse algorithms that can be utilized to reconstruct the EP signals on a surface of interest are disclosed in U.S. Pat. Nos. 7,983,743 and 6,772,004, which are incorporated herein by reference.

An indication of noise for the reconstructed electrophysiological signals on the surface of interest further can be computed and, if the indication of noise for the reconstructed electrophysiological signals exceeds a noise threshold, the method can determine a support event. Additionally, one or more graphical maps can be generated based on the reconstructed EP signals on the surface of interest, and a physiological coherence can be calculated from the graphical map. If the physiological coherence (e.g., noise) computed for the graphical map describes a coherence value that is below a respective threshold, the method can determine the support event At 106, the method includes sending a request to one or more remote support specialists responsive to determining at least one support event (at 104). The request can be sent from the computing apparatus (e.g., which is executing instructions to perform the method 100) directly to one or more remote support specialists, or the request can be sent to a server (or other messaging platform) to manage sending the request to one or more remote support specialists. One or more remote support specialists can receive the request at respective computing apparatuses, which can vary depending on the protocol used to send the request to the remote support specialists. As an example, the request can be sent as an email (e.g., using Simple Mail Transfer Protocol (SMTP), Internet Message Access Protocol (IMAP), or other email protocol), text message (e.g., using short message service (SMS) protocol) or other messaging formats. The second computing apparatus, which is used by the remote support specialist, can be a smart phone or device, a desktop computer, a laptop computer, a tablet computer or a workstation. Thus, the computing apparatus includes a user input device (e.g., touchscreen, keyboard, mouse and/or other) to enable the remote support specialist to accept the request in response to a user input through the user input device.

At 108, the method 100 includes establishing a communication link between the first computing apparatus and the second computing apparatus, which is associated with a respective remote support specialist. The second computing apparatus can be the same computing apparatus at which the specialist received the request that was sent at 106. Alternatively, the second computing apparatus can be different from the computing apparatus at which the specialist received the request that was sent at 106. The communications link can provide a communications path through one or more networks, which can include local area networks, wide area networks or a combination of networks. The communications path can further include one or more of wireless data communications (e.g., Bluetooth, WiFi, cellular data) and/or communications over physical paths (e.g., electrically conductive wires or traces and/or optical fibers). The communications path can include one or more secure channels, such as using a secure shell (SSH) protocol, transport layer security and/or secure socket layer (SSL), to provide for bi-directional communications between the respect computing apparatuses.

In an example, the first computing device includes remote desktop software (e.g., machine readable instructions) programmed to implement remote desktop protocol (RDP) or other application sharing protocol (commercially available or proprietary) that is tunneled over SSH. The second computing apparatus thus connects to the first computing apparatus through the communications link. In an example where the connection is encrypted through a secure tunnel (e.g., SSH tunneling), an unencrypted protocol can be used to transmit information between the first and second computing apparatuses. Because the request includes data describing the support event, the remote support specialist can know the type of support that is needed at the current stage of the EP workflow session in advance. In some examples, a bidirectional video and/or audio connection is established, through which respective users can discuss current circumstances or other issues relating to the EP workflow session, including while rendering the remote support.

At 110, the method includes enabling user interaction with and control of the machine-readable EP workflow instructions running on the first computing apparatus responsive to user input by the respective remote support specialist at the second computing apparatus. For example, the first computing apparatus implements the application sharing code to provide the second computing apparatus (e.g., the remote support specialist) a graphical user interface through which the remote support specialist can access and utilize the EP workflow software system running on the first computing apparatus. In some examples, control is transferred to the remote support specialist in response to a user input by the operator at the first computing apparatus. Alternatively, in other examples, control is transferred to the remote support specialist automatically responsive to the remote specialist invoking activation instructions provided with the request.

After control has been transferred, the first computing apparatus can receive instructions in response to user input instructions provided at the second computing apparatus to control execution the EP workflow instructions and/or workflow data at the first computing for an upcoming event or, if some instructions or functions need to be re-executed, to redo some or all of a past event. Additionally, in some examples, after the control is transferred, some level of controls can remain active at each of the first and second computing apparatuses (e.g., some or all control remains with the local operator), which further can enable collaboration in response to user inputs provided at each of the computing apparatuses. The graphics and control afforded the remote support specialist at the second (remote) computing apparatus can be the same or comparable to that which are rendered locally on the first computing apparatus (e.g., as if the specialist were co-located with the operator). After the remote support specialist has rendered assistance, full control may be returned to the local operator at the first computing apparatus. Alternatively, when the control is transferred, controls can remain active at second computing apparatus until the communication link has been terminated (e.g., in response to a user input by either user).

Figure 2:
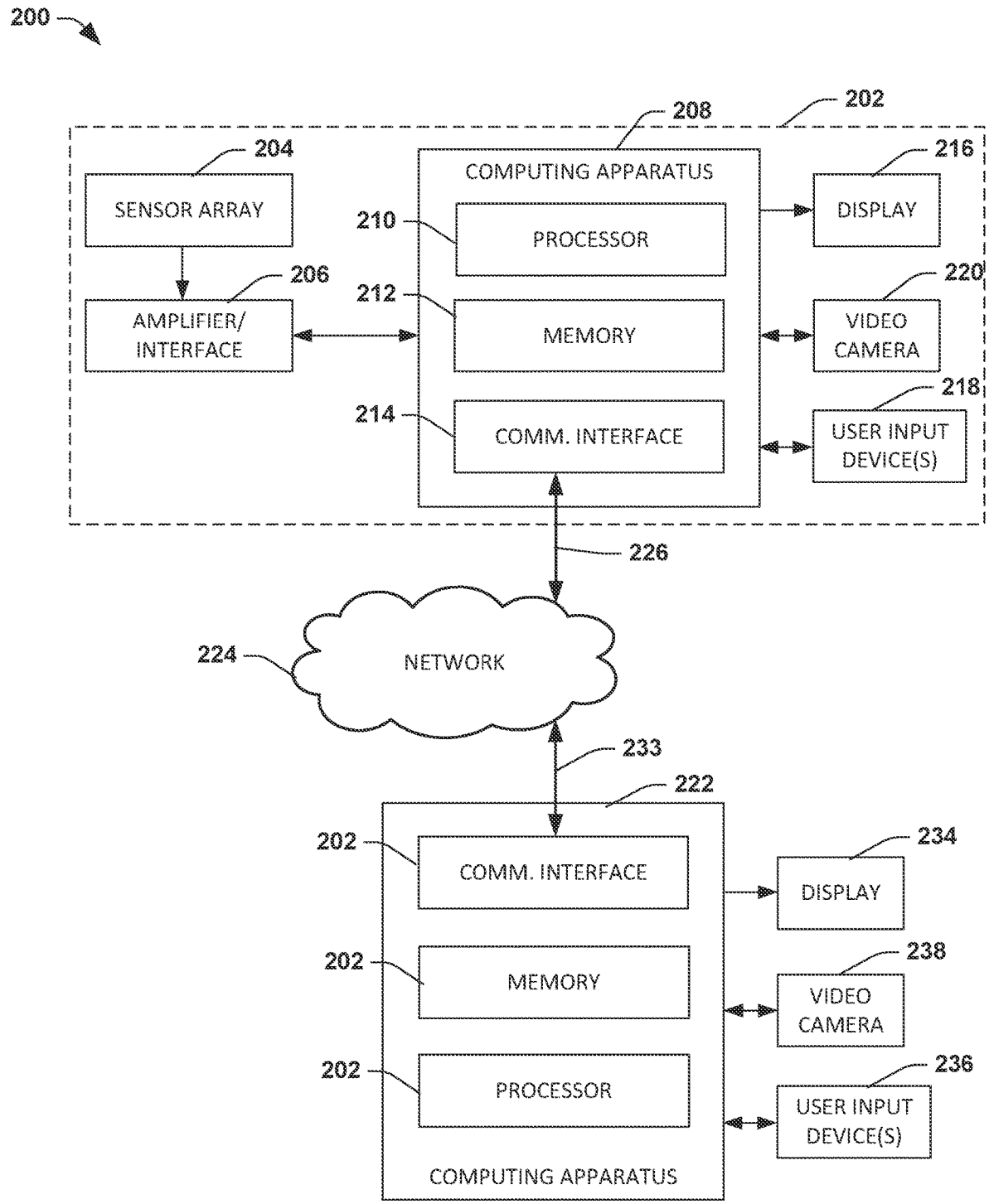
FIG. 2 is a block diagram that illustrates a system configured to implement automated triggers for electrophysiology case support.

FIG. 2 illustrates an example computing system 200 that can implement the method 100. Thus, the description of FIG. 2 also refers to the method of FIG. 1. Additionally, further examples of support events that can be determined as well as further examples of workflow instructions that can be controlled by the support specialist through the communications link, which can be included in the method 100, may be better appreciated with reference to the following description of FIGS. 2-8.

The computing system 200 of FIG. 2 includes an EP system 202. The EP system 202 can be implemented as any system configured to perform stimulation, perform ablation, measure EP signals, and/or perform mapping based on signal measurements, such as can be used in an EP laboratory. Examples of some types of EP system 202 are disclosed in U.S. Pat. Nos. 9,078,573, 9,427,166 and 10,076,260, each of which is incorporated herein by reference. In the example of FIG. 2, the system includes a sensor array 204 that includes one or more sensors configured measure EP signals from patient's body. For example, the sensor array 204 includes an arrangement of body surface sensors to measure EP signals non-invasively from an external body surface. One example of an arrangement of body surface sensors that can be used to implement the sensor array 204 is disclosed in U.S. Pat. No. 9,655,561, which is incorporated herein by reference. Other arrangements of body surface sensors can be used in other examples. In an alternative or additional example, the sensor array 204 can measure EP signals from within the patient's body, such as from a cardiac surface (e.g., by contact or non-contact sensors).

For example, the sensor array 204 includes a plurality input channels configured to receive electrical signals from respective electrical sensors (e.g., electrodes). In some examples, the input channels provide electrical signals representing EP signal measurements according to the location where the sensors are placed (e.g., non-invasively on the body surface and/or invasively within the patient's body). Each of the electrical sensors in the array 204 is coupled to an amplifier/interface 206 such through one or more connectors. The amplifier/interface 206 thus can receive signal measurements from any sensors in the array. The amplifier/interface 206 can be configured to amplify the signals from each of the sensors and provide a set of amplified electrical signals via an output to a computing apparatus 208. The amplifier/interface 206 can include signal processing circuitry, such as for filtering signals to remove noise, and/or circuitry configured to convert the measured EP signals to corresponding digital signals.

In the example of FIG. 2, the computing apparatus 208 includes one or more processors 210, memory 212 and a communications interface 214. The memory 212 can include one or more forms of memory (e.g., one or more non-transitory computer readable media) configured to store data and machine readable instructions that can be accessed by the processor 210 through a bus structure. The processor thus can access data and execute respective instructions, including EP measurement and analysis software instructions, to perform functions and methods disclosed herein (see, e.g., FIGS. 1, 3 and 4).

A display 216 can be coupled with the computing apparatus 208. The display can be coupled to a video interface (e.g., hardware and software) of the computing apparatus 208 through a cable. In some examples, the display can be integral with the computing apparatus 208. The hardware and software implemented by the computing apparatus 208 are configured to control output data (e.g., information and graphics) that is provided to the display 216 for visualization. For example, the display 216 can include one or more of a monitor, projector, virtual reality headset or other type of display device.

The system 202 can also include one or more input devices 218, such as a pointing device (e.g., a mouse or touch screen) and/or other input device (e.g., a keyboard or gesture control). A user thus can use the input devices 218 to interact with and control the computing apparatus 208 and instructions (e.g., GUI or other functions and methods) executed by the processor 210. For example, instructions in the memory 212 include a user interface (e.g., a graphical user interface) that can enable a user to control the data acquisition process, analysis and generation of EP maps and other outputs. The display 216 may present the GUI and other visualization, and the user can enter commands and information into the computing apparatus through the input device 218 to enable interaction with the GUI and other functions and methods.

In some examples, the EP system 202 can also include a camera. The camera can include a microphone and be configured to capture real-time video and audio according to the field of view. For example, the video and audio can include a local operator at the site of the system 202, such as for use during a video session with one or more remote support specialists (at another computing apparatus 222). The audio and/or video can be compressed to facilitate streaming thereof over a communications link.

The communications interface 214 is configured to connect the computing apparatus to a network 224 through a physical or wireless link, shown as 226. The network 224 can include one or more local area network (LAN), a wide area network (WAN), such as the Internet, and/or any other type of or combination of computer networks. The computing apparatus 208 can include more than one communications interface 214 to enable connections to the network 224 through one or more respective communication links according to the physical and data link layer (e.g., Ethernet, WiFi, cellular data) being implemented by the respective interface(s). As described herein, in response to the computing apparatus determining a support event based on workflow data (e.g., stored in memory 212), a request is sent to one or more remote support specialists through the link (or through multiple links) 226.

For example, one or more remote support specialists can each have access to one or more remote computing apparatus 222. Similar to the computing apparatus 208, the remote computing apparatus 222 can include a processor 228, memory 230 and a communications interface 232. The computing apparatus 222 can be coupled to the network 224 through a respective communications link, shown as 233. In an example, a secure tunneling (e.g., using SSH) can be implemented in the connection 226, 224 and 233 between the computing apparatuses 208 and 222.

The computing apparatus 222 can have the same or different configuration or form factor from the computing apparatus 208. Additionally, the computing apparatus 222 can include or be coupled to a display 234 as well as one or more user input devices 236. In some examples, the computing apparatus 222 can include or be coupled to a camera 238, such as to provide for bi-directional communications with the computing apparatus 208 during an EP workflow session. The memory 230 can include instructions and data (e.g., a remote desktop client) configured to view and control the EP system 202 from the remote computing apparatus 222 (e.g., through a secure connection) in response to user inputs entered through the user input device 236.

Figure 3:
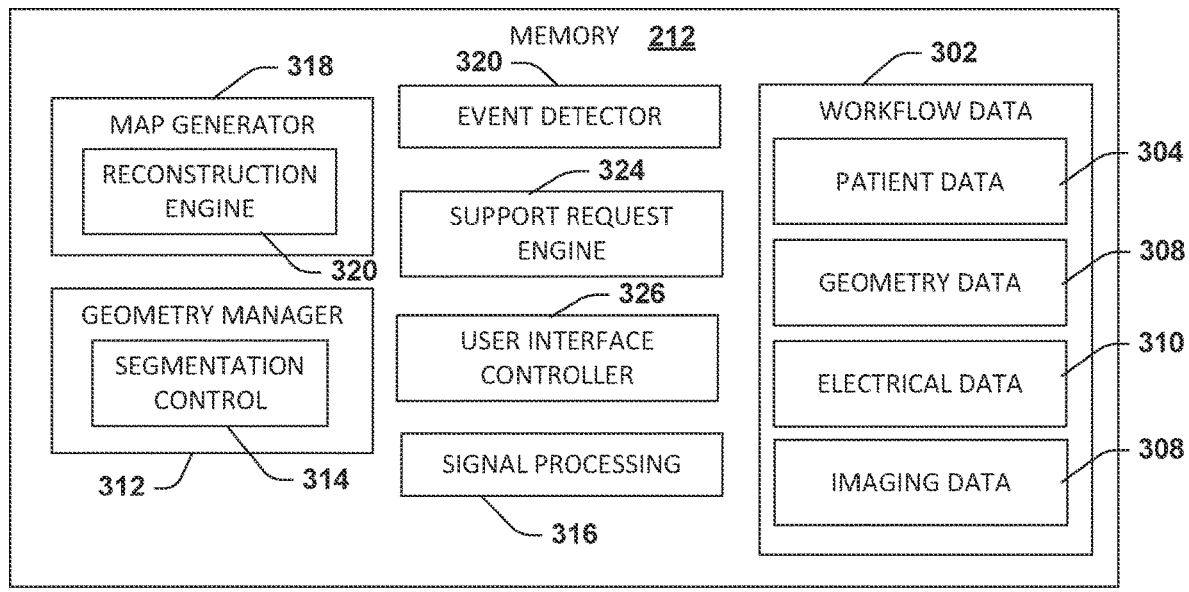
FIG. 3 is a block diagram that illustrates software code programmed to implement automated triggers for electrophysiology case support.

By way of further example, FIG. 3 is a block diagram of the memory 212 that illustrates an example of data and instructions that can be stored in the memory. The data includes workflow data 302. As described herein, the workflow data 302 can include any information associated with and/or describing electrical signal measurements, the sensing function or location of electrical sensors, one or more patient conditions, operator characteristics as well as other information that is input into the computing apparatus or derived from such information for the given EP workflow session. In the example of FIG. 3, the workflow data includes patient data 304, image data 306, geometry data 308 and EP data 310.

Patient data 304 can include patient demographics, such as can be retrieved from an electronic health record or entered by the operator or assistant. For example, the patient data 304 can describe a known physiological condition or disease, and can include electrical and/or anatomical features. As a further example, the patient data can specify special circumstances indicative of a likely increased complex EP study due to complicating patient conditions. For example, the patient condition can describe an abnormal heart condition (e.g., Brugada syndrome). In another example, the patient condition data can specify a structural complicating issue, such as a congenital or other deformity, scar tissue from previous procedure or injury or an implanted medical device (e.g., pacemaker and/or defibrillator). As described herein, the existence of these and other complicating factors in the patient data 304 can be used to trigger a support event.

The image data 306 can include two-dimensional or three-dimensional image data acquired for the patient using a medical imaging modality. Examples of imaging modalities include ultrasound, computed tomography (CT), 3D Rotational angiography (3DRA), magnetic resonance imaging (MRI), x-ray, positron emission tomography (PET), fluoroscopy, and the like. In an example, the image data 306 is acquired using an imaging modality while a sensor array 204 is placed on the patient's body. In this way, the resulting image(s) in imaging data include both the patient's anatomy and the sensors in the array 204.

The geometry data 308 is derived from the image data 306 to describe the spatial relationship for portions of the patient anatomy and the sensors in the array 204. By way of further example, the geometry data 308 can include a representation of one or more geometrical surfaces, such as including a portion of an outer surface of the patient's body and a surface of interest within the patient's body. The geometry data 308 can describe 3D spatial coordinates for each of the sensors (e.g., centroids of respective sensors) as well as describe a surface of interest within the patient's body in a common coordinate system. As disclosed herein, the sensors can include body surface sensors in the sensor array 204 as well one or more invasive sensors positioned within the patient's body (e.g., affixed to a catheter or other probe). The surface of interest can correspond to a three-dimensional surface geometry corresponding to a surface of the patient's heart, which surface can be epicardial and/or endocardial. Alternatively or additionally, the surface of interest can correspond to a geometric surface that resides between the epicardial surface of a patient's heart and the surface of the patient's body where a sensor array has been positioned. Additionally, the geometry data 308 can correspond to actual patient anatomical geometry, a preprogrammed generic model, or a combination thereof (e.g., a model that is modified based on patient anatomy).

As an example, the geometry data 308 may be in the form of a graphical representation of the patient's torso. For example, a geometry manager 312 can be configured to manage and generate the geometry data 308. The geometry manager 312 includes or otherwise is configured to use a segmentation control programmed to extract and segment anatomical features, including one or more organs and other structures, from a digital image set corresponding to the image data 306. For example, the segmentation control 314 can perform thresholding or other operations to identify respective surfaces and surface boundaries in the image data 306, including for the surface interest and the outer surface where the sensors are positioned. For example, the segmentation control 314 can be programmed to extract and segment each of the sensors in the sensor array 204, such as an automatic segmentation method and/or in response to a user input, and store respective sensor locations in the geometry data 308. Other non-imaging based techniques can also be utilized to obtain the position of the sensors in the sensor array, such as a digitizer or manual measurements, and the sensor locations can be registered in the spatial coordinate system with the surface of interest. Similarly, the geometry manager 314 can be programmed to identify locations on the surface of interest from the image data 306, such as in response to a user input or through automated extraction and segmentation methods. Resulting spatial coordinates for the sensor locations and surface(s) of interest can be stored as the geometry data 308.

In some examples, the geometry manager 312 can provide the geometry data 308 as a mathematical model (e.g., a mesh having respective vertices connected by line segments to define each surface), such as can be a generic model or a model that has been constructed based on the image data 306 for the patient. Appropriate anatomical or other landmarks, including locations for the sensors in the sensor array, can be identified and stored in the geometry data 308. The identification of such landmarks can be done manually (e.g., in response to a user input) or automatically (e.g., via image processing techniques) and, in some examples, can be implemented by segmentation control 314 or other functions in the geometry manager 312.

The EP data 310 includes electrophysiological signals measured by the sensors of the array 204. In some examples, the EP data 310 can also include electrophysiological signals measured by one or more sensors within the patient's body. In some examples, the electrophysiological signals are acquired in real-time, such as during a procedure or study. For example, the EP data 310 can correspond to a real time data flow that can be acquired by non-invasive (e.g., body surface) sensors during a procedure such as during an electrophysiological study as well as during a treatment procedure that can include cardiac ablation. In other examples, the EP data 310 includes electrophysiological measurements acquired over an extended period of time prior to a procedure, such as by a Holter monitoring system or the like. As described herein, a signal processing function 316 can be applied to the EP data 310.

The EP data can be raw EP signals or can have had pre-processing applied. For example, such pre-processing can include line-filtering, offset correction, analog-to-digital conversion and the like to remove selected noise components from the respective input channels such that the EP data 310 includes digital representations of the pre-processed signals for each input channel. The signal processing function 316 can be configured to perform additional filtering and signal analysis methods, such as can be configured in response to a user input (e.g., though user input device 218). The filtering can include notch, bandpass, high-pass and/or low-pass filtering. Signal analysis can include fast Fourier transform, and frequency domain analysis. Other signal processing functions can be implemented in other examples.

In addition to EP signals sensed from the patient's body surface, other sensors can be used to sense other patient conditions (e.g., heart rate, pulse rate, blood pressure, respiration rate, pulse oxygen level, etc.), which can also be stored as part of the workflow data 302. The workflow data 302 can also include operator data for one or more operators utilizing the EP system 202. For example, a user-operator can use the user input device 218 to login to the computing apparatus 208 and to an EP application, which can retrieve operator characteristics from memory (local or remote). Alternatively, the operator can manually enter relevant characteristics through the user input device 218. Operator characteristics can include a qualification (or training) level of the operator with respect to each phase of the EP workflow session or conditions of the operator that can be sensed during the session. For example, when the operator logs into the computing apparatus, an operator profile can be retrieved based on the operator login information, which includes respective qualification levels. During the workflow session, cameras (e.g., infrared and/or visible light cameras) 220 can be used to monitor operator gestures and/or facial expressions (e.g., change in skin hue, temperature changes, heart rate changes) that are indicative of stress and/or anxiety.

The instructions also include a map generator 318 configured to generate a graphical map representing reconstructed electrophysiological signals on the surface of interest for one or more intervals. Thus, the map generator 318 can include a reconstruction engine 320 configured to reconstruct the electrophysiological signals on a surface of interest based on the geometry data 308 and the EP data 310.

For example, the reconstruction engine 320 can be configured to compute an inverse solution to reconstruct electrophysiological signals on the surface of interest within the body of the patient based on the electrophysiological data 310 and the geometry data 308. Examples of solutions to the inverse problem, which the reconstruction engine 320 can use, include a boundary element method (BEM) or a method of fundamental solution (MFS). In some examples, the inverse calculation can employ a transformation matrix, which is derived from the geometry data 308, to reconstruct electrical activity sensed on the patient's body onto the surface of interest. Examples of inverse algorithms that can be utilized by the reconstruction engine 320 to implement the inverse solution include those disclosed in U.S. Pat. Nos. 7,983,743 and 6,772,004, each of which is incorporated herein by reference. The reconstruction engine 320 thus can reconstruct a body surface electrical activity measured via the sensors (e.g., the sensor array) on a body of the patient onto a multitude of locations (e.g., nodes distributed across on the surface of interest (e.g., an epicardial and/or endocardial surface).

The map generator 318 further may compute or derive one or more graphical maps from the reconstructed electrophysiological signals to provide an output on the display 216 and visualize features of the reconstructed signals across the surface of interest for one or more respective time intervals. For example, the map can include a potential map, a butterfly map, a phase map, a propagation map, and/or an activation map or other map, which type of map can be selected in response to a user input (e.g., though input device 218). The EP system 202 can be configured to provide the map (or maps) and can modify feature of such maps, such as in response to a user input selecting the type of map, one or more output parameters or signal intervals for processing and inclusion in the selected map. The map generator 318 can generate the map from real-time EP signals that are being acquired, or the map can be generated for a prior time interval, such as can be selected in response to a user input (e.g., using input device 218).

The instructions also include an event detector 322 programmed to detect a support event associated with the EP workflow based on the workflow data 302. The event detector 322 can be programmed to detect support events based on the workflow data 302 for one or more phases of the EP workflow process, such as including patient/sensor setup, segmentation of imaging data, generating geometry data, EP data acquisition and mapping phases. Thus, the event detector 322 can generate support event data to describe the detected event. The support event data can be stored in the memory 212, such as part of log for the EP workflow. The support event data can include an event name, supporting workflow data (or the results of analyzing the workflow data) to specify the cause (or causes) that triggered the event. Additional workflow data 302 can be store in memory 212 for the event part of the support event data, including logistic information (e.g., time, date, etc.), patient information (e.g., patient ID, condition, health information etc.), operator information (e.g., operator name/ID, affiliation, etc.) and the like. Additionally, the event detector can provide an indication of the detected support event can be provided to the operator, such as by providing a text, graphical and/or audio message on the display or other output of the system 202. For example, a graphical element can be provided on a GUI of the display 216 to notify the operator of the detected support event. The graphical element can be a button or other GUI element that the operator can activate in response to a user input (e.g., using user input device 218), such as to decline the request, accept the request and/or acknowledge the support event.

A support request engine 324 can be programmed to generate and send one or more requests in response to the event detector detecting a support event. In an example, the request can include data specifying the support event that the event detector 322 has determined, such as based on the event support data. For example, the request data (and/or event support data) can be used to identify one or more support specialists who are qualified to render remote support for the detected support event. The request can also include a resource locator (e.g., a uniform resource identifier, such as a URL or other link) that can be used (in response to a user input) by a respective remote support specialist, who receives the request, to accept and initiate providing remote support. A support session can be established in response to (or when) the request is generated, in response to detecting the support event or in response to a remote specialist activating the session in response to a user input (e.g., through user input device 236 of a remote computing apparatus 222). In addition to describing the determined support event and enabling the recipient to access and connect to the local EP workflow session, the request can also specify operator information (e.g., operator identity, experience level etc.) as well as data describing the patient's condition. However, the request engine 324 can be configured to remove any personal and health-related information of the patient necessary to maintain HIPPA compliance and/or institutional security.

In some examples, the event detector 322 can be programmed to (as a default condition) designate one or more portions of the workflow as requiring review and/or approval by a mapping specialist before proceeding to a next portion of the session. Thus, in response to reaching such designated portion, the event detector 322 can trigger a support event, in response to which the support request engine 324 sends a request (e.g., a notification) to obtain approval from a remote specialist. Because, such pre-designated portions of the workflow are known in advance, the event detector can trigger the support event before reaching the designated event (e.g., generate the support event when the event is approaching or imminent). Another example of a portion of the workflow that can determine a support event is a final check of one or more maps or other generated EP data that is expected to be used to drive an intervention (e.g., treatment or therapy or implant).

In some examples, the support request engine 324 is resident on the local computing apparatus 208. In other examples, the support request engine 324 resides on a remote computer, such as a server or cloud. In either configuration, the support request engine 324 can be configured to determine to which support specialists each request is sent. Alternatively, such as in the example where support request engine 324 resides locally on computing apparatus 208, the support request engine 324 can send the request to a message service to control distribution of the request to one or more support specialist. The message service can be fully automated or it can be semi-automated such as using a person to select and control where each request is sent. The request can be sent based on availability, work schedules and other human resource parameters. In one example, the support request engine 324 is configured send the request to the respective remote support specialist based on the remote support specialist being a subject matter expert with respect to a condition of the patient, such as a particular abnormal heart condition.

The instructions can also include a user interface control 326. The user interface control 326 is configured to establish a communication link between the first computing apparatus and a second computing apparatus, which used by a respective remote support specialist. For example, the remote specialist can activate a link (e.g., URL or other resource identifier), which is provided in the request received by the remote support specialist, to accept and activate the request. As mentioned, the request can be sent using a messaging protocol to send the request (e.g., an email, text, SMS or the like) to one or more remote support specialists. In response to activating the link at the specialists computing apparatus, the communication link can be established to remotely connect the specialist's computing apparatus to the EP system 202, such as described herein.

The user interface control 326 can also be configured to enable user interaction with and control of the machine-readable EP workflow instructions (in memory 212) executing on the computing apparatus 208 responsive to a user input (through user input device 236) by the respective remote support specialist at the second computing apparatus 222. For example, the computing apparatus 208 of the EP system 202 executes the user interface control 326 to implement an application sharing protocol (e.g., RDP) that is tunneled over SSH through a network architecture. As a result, the remote support specialist can control the functions of the EP system 202 running on the local computing apparatus 208.

Figure 4:
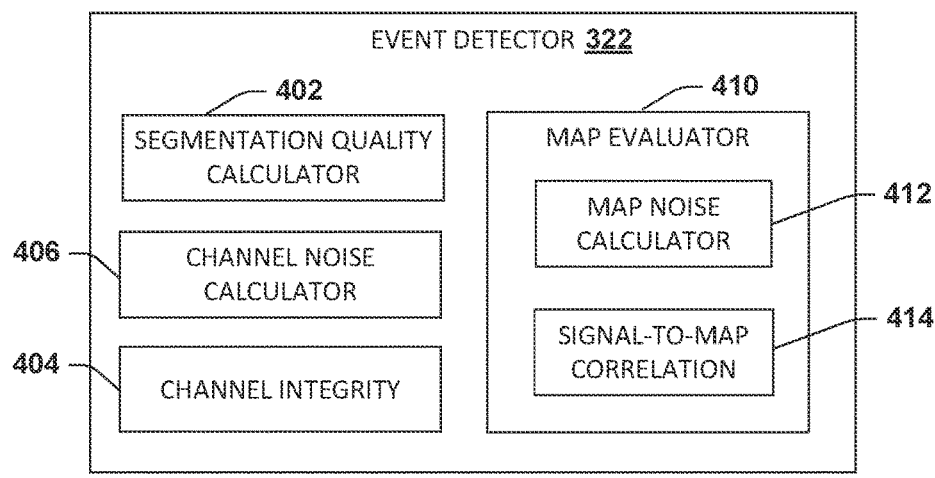
FIG. 4 is a block diagram that illustrates further software functions programmed to implement the event detector of FIG. 3.

As shown in FIG. 4, the event detector 322 further can include analysis functions configured to determine the occurrence of one or more support events based on workflow data 302 during respective phases in EP workflow session. For example, the event detector 322 includes a segmentation quality calculator 402. The segmentation quality calculator 402 is programmed to compute a quality score based on a segmentation performed (e.g., by segmentation control 314) on the image data 306, which was acquired pre-procedure. For example, the segmentation quality calculator 402 is configured to evaluate the segmentation quality based on one or more of following characteristics of the segmented structure or structures: unknown structure and/or shapes (e.g., valves, LADs, CS); smoothness of cardiac surfaces; a relative alignment with CT volume; an alignment with one or more templates; the time period to complete the segmentation, etc. The scoring methods can be updated as more templates and/or more segmented geometries are scored.

The segmentation quality calculator 402 can compare the quality score relative to a segmentation quality threshold and determine the occurrence of a segmentation support event responsive to the comparison. For example, consistency of the segmentation can be compared to a particular gray scale threshold on the medical imaging modality used. Alternately or additionally, the rendered anatomy can be compared to a database to seek deviations beyond a particular threshold for surface area, volume, or similar parameters. After the remote specialist has connected to the EP workstation during the current workflow, the instructions in memory 212 can enable the respective remote specialist to implement the segmentation control 314 to perform another image segmentation on the image data 306 through the communication link responsive to a user input at the remote computing apparatus 222. As a result, the image data can be segmented remotely to provide segmented image data that is stored in memory 212 of the first computing apparatus 208. During the process, the remote support specialist can describe the process and educate the operator to reduce the likelihood of the same support event being triggered again.

The event detector 322 can also include a channel integrity function 404. The channel integrity function 404 is programmed to determine one or more indications of channel integrity for each of the input signal channels providing EP signals for respective sensors of array 204. For example, the channel integrity function 404 uses the signal processing function 316 to analyze the EP data 310 to ascertain the integrity of respective sensors positioned on an outer surface of a patient's body. The signal processing function thus can perform signal processing on the EP data 310 to extract one or more components from the measured electrophysiological signals. The event detector 322 thus can trigger the support event to cause the request to be sent to the respective remote support specialist based on the extracted one or more components.

In another example, the channel integrity function 404 can be configured to determine a value representing the acceptability and/or integrity of some or each of the respective channels that provide the EP data 310. As an example, the channel integrity function 404 can be programmed to determine channel integrity for some or all EP sensors in the array 204 that have been placed on the patient's body, such as according to any of the approaches described in U.S. Pat. Nos. 9,977,060 and/or 10,874,318, each of which is incorporated herein by reference. Thus, the event detector 322 can trigger the support event to cause the request to be sent to the respective remote support specialist based on the determined channel integrity.

The event detector 322 can also include a channel noise calculator 406. For example, the signal processing function 316 can be programmed to compute an indication of signal to noise (SNR) for respective signal channels (a selected set or all of the channels). The channel noise calculator 406 can evaluate the computed SNR values relative to a threshold to determine if channel noise exceeds a noise threshold. If the noise exceeds the noise threshold, the event detector 322 thus can trigger the support event to cause the request to be sent to the respective remote support specialist based on the noise level.

In another example, the channel noise calculator 406 can be programmed (e.g., include a sensor confidence map generator) to generate a confidence map of the respective sensors positioned on the outer surface of the patient's body based on the computed SNR or other indication of channel noise. The event detector can determine a support event based on the confidence map indicating a low confidence level across the body surface (as compared to a confidence threshold). The confidence threshold can vary depending on the type of mapping functions being implemented and/or the region of interest within the patient's body. For example, a low confidence in one region of the body surface may adversely affect a map of a first region of the heart (e.g., noisy section of the output map) but have little or no impact on the map within a second (different) region of the heart.

As a further example, the channel noise calculator 406 can invoke the signal processing function 316 to perform signal processing extract P-waves from the electrophysiological signals based on amplitude and frequency thereof. The signal processing function 316 can also perform FFT on the extracted P-waves and analyze spectral features in the extracted P-waves. The channel noise calculator 406 can be programmed to identify baseline noise in the electrophysiological signals (e.g., by averaging noise across the body surface or a portion thereof) and compare the amplitude of the P-waves to with respect to the baseline noise. A support event can be determined if the P-wave amplitudes are too small (e.g., below a threshold). For example, the P-wave threshold can be applied locally or regionally in neighborhoods, such as to account for far-field interference or other localized noise features.

The event detector 322 can also include a map evaluator function 410 programmed to determine the occurrence (or non-occurrence) of a support event based on an evaluation of one or more maps generated by the map generator 318. As described herein, the electrophysiological data 310 is provided based on electrophysiological signals measured from sensors of the array 204 positioned on an outer surface of a patient's body. The map generator 318 employs reconstruction engine 320 to reconstruct electrophysiological signals on a surface of interest within the patient's body based on the EP data 310 and geometry data 308. One or more maps can be generated with or derived from the reconstructed EP signals. The map evaluator function 410 can evaluate such maps or derivations thereof to determine whether to trigger a support event.

For example, the map evaluator function 410 can include a map noise calculator 412 programmed to compute an indication of noise for the reconstructed electrophysiological signals on the surface of interest. The noise can be a global indication of noise across the surface of interest or it can be computed regionally for respective regions of interest distributed across the surface of interest. The event detector 322 thus can determine a support event to trigger sending a request to respective remote support specialist(s) based on the indication of noise computed for the reconstructed electrophysiological signals.

In another example, the map noise calculator 412 can be programmed to compute a physiological coherence across a graphical EP map according to arrangement and distribution of pixel values (e.g., set according to a color scale). The event detector 322 thus can determine a support event to trigger sending a to the respective remote support specialist based on the physiological coherence of the graphical map.

The map evaluator function 410 can also include a signal-to-map correlation function 414 programmed to compute a correlation between the EP data 310 and a map generated from the EP data for a common time interval (or intervals). The correlation function 414 For example, EP signals for a subset of sensors distributed across the body surface can be correlated with respect to signals for a subset of nodes across the surface of interest. The numbers of signals can be the same or different, and may include less than all or up to all the respective measured and reconstructed signals. In one example, the correlation function 414 can invoke the map generator to generate a phase map for the set of reconstructed electrophysiological signals on the surface of interest. The correlation function can compute a correlation between the phase map and the measured EP signals. If the correlation indicates that the phase map is not aligned with the phase of the measured EP signals (e.g., a phase shift exceeds a threshold), the event detector 322 can determine a support event to trigger the request engine to send a request to one or more support specialists based on the correlation between the phase map and the measured electrophysiological signals.

In another example, the support request engine 324 can be programmed to route the request to a respective remote support specialist based on a type of map that the operator has selected from a plurality of available map types (e.g., in response to a user input instruction to the map generator 318). For example, the request can include data specifying a type of the map, such that support specialists having a higher level of experience with certain types of maps can be matched with requests specifying those types of maps.

In another example, the map generator 318 includes GUI elements to enable an operator of the first computing apparatus 208 to retain or discard each map that is generated in response to a user review input instruction (e.g., using input device 218). The EP application further can include instructions to determine a number of maps retained by the operator relative to a number of maps that the operator has discarded or tagged as being undecided in response to user review input instructions. The event detector 322 further can be programmed to determine a support event and trigger the request engine to send a request to one or more support specialists based on the number or ratio of maps being retained and discarded or tagged as undecided.

Figure 5:
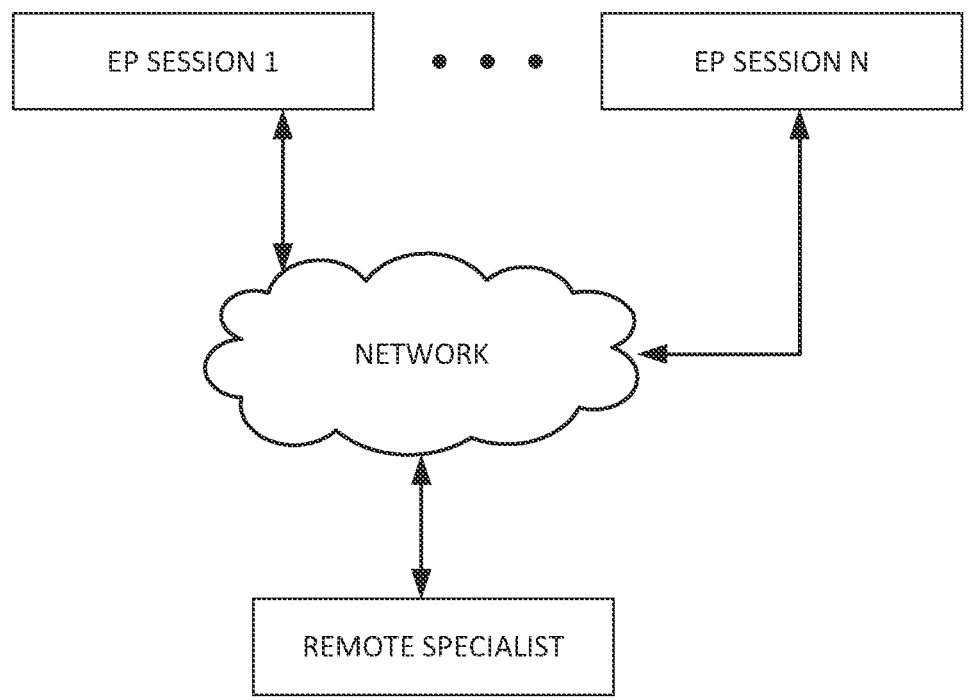
FIG. 5 is a block diagram that illustrates an example system architecture to implement automated triggers for electrophysiology case support.
Figure 6:
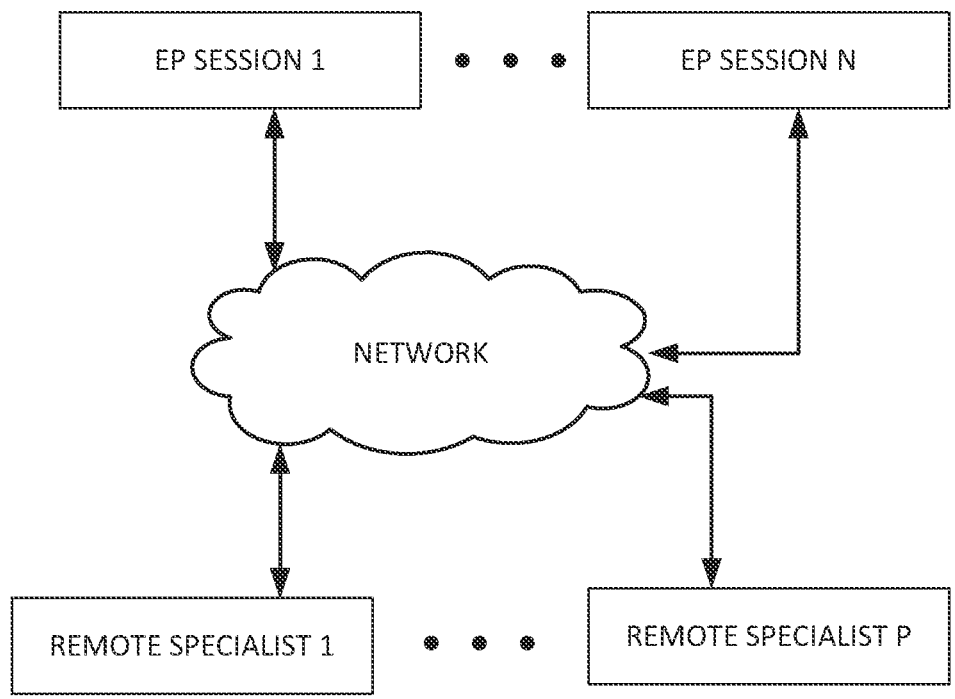
FIG. 6 is a block diagram that illustrates another example system architecture with multiple remote specialists to implement electrophysiology case support.

FIGS. 5 and 6 are block diagrams showing respective system architectures for different scenarios. In FIG. 5 a given remote specialist is shown to provide remote support from a respective computing apparatus with respect to multiple EP systems being implemented concurrently at different locations. In FIG. 6, multiple (P) remote support specialists are shown for providing remote support from respective computing apparatuses with respect to multiple (M) EP systems being implemented concurrently at different locations, where M and be can be the same or different.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. One or more non-transitory machine-readable media to store data and instructions executable by one or more processors, the instructions programmed to, when executed by the one or more processors, cause the one or more processors to at least:
   analyze workflow data for a given phase of a plurality of phases of an ongoing electrophysiology (EP) workflow implemented using a first computing apparatus;
   determine at least one support event based on the analysis of the workflow data;
   send a request to at least one remote support specialist responsive to determining the at least one support event;
   establish a communication link between the first computing apparatus and a second computing apparatus responsive to the request being accepted by a respective remote support specialist, in which the second computing apparatus is associated with the respective remote support specialist; and
   enable user interaction with and control of the machine-readable instructions, which are executing on the first computing apparatus for the EP workflow, responsive to a user input by the respective remote support specialist at the second computing apparatus.

2. One or more non-transitory machine-readable media to store data and instructions executable by one or more processors, the instructions programmed to, when executed by the one or more processors, cause the one or more processors to at least:
   analyze workflow data for a given phase of a plurality of phases of an ongoing electrophysiology (EP) workflow implemented using a first computing apparatus;
   determine at least one support event based on the analysis of the workflow data, wherein the at least one support event comprises at least one of an exception, complexity or ambiguity in or derived from the workflow data;
   send a request to at least one remote support specialist responsive to determining the at least one support event;
   establish a communication link between the first computing apparatus and a second computing apparatus, which the second computing apparatus is associated with a respective remote support specialist; and
   enable user interaction with and control of the machine-readable instructions, which are executing on the first computing apparatus for the EP workflow, responsive to a user input by the respective remote support specialist at the second computing apparatus.

3. The media of claim 1, wherein the instructions on the first computing apparatus are further programmed to:
   provide a graphical user interface at the second computing apparatus through the communication link, in which user inputs provided at the second computing apparatus are programmed to control the instructions and/or the workflow data at the first computing apparatus;
   transfer control to the remote support specialist for an upcoming event in the EP workflow; and
   receive instructions via the graphical user interface at the second computing apparatus and send the received instructions through the communication link to control the instructions and/or the workflow data at the first computing apparatus for the upcoming event.

4. The media of claim 1, wherein the workflow data includes or is generated based on at least one of electrical signal measurements from a patient, a patient data, geometry data, imaging data or another parameter of the EP workflow.

5. The media of claim 4, wherein the workflow data comprises data specifying an abnormal heart condition, and wherein the request is sent to the respective remote support specialist through the communication link in response to determining the respective remote support specialist is a known subject matter expert with respect to the abnormal heart condition.

6. The media of claim 4, wherein the workflow data comprises pre-procedure imaging data acquired by an imaging modality, the instructions further programmed to compute an indication of quality based on the imaging data, and wherein the request is sent to the respective remote support specialist based on an evaluation of the indication of quality relative to a threshold.

7. The media of claim 6, wherein the instructions to compute the indication of quality are further programmed to compute a quality score for segmentation performed on the acquired imaging data and compare the quality score relative to a segmentation quality threshold, the instructions further programmed to enable a second image segmentation performed by the respective remote support specialist at the second computing apparatus through the communication link to provide segmented image data that is stored in memory of the first computing apparatus.

8. One or more non-transitory machine-readable media to store data and instructions executable by one or more processors, the instructions programmed to, when executed by the one or more processors, cause the one or more processors to at least:
provide electrophysiological data representative of measured electrophysiological signals from a plurality of sensors positioned on an outer surface of a patient's body; and
compute an indication of noise for at least some of a plurality of signal channels, corresponding to a respective electrophysiological signal, and/or an indication of noise for at least some of a plurality of reconstructed electrophysiological signals, in which the plurality of reconstructed electrophysiological signals are reconstructed on a surface of interest based on electrophysiological data, analyze workflow data for a given phase of a plurality of phases of an ongoing electrophysiology (EP) workflow implemented using a first computing apparatus;
determine at least one support event based on the analysis of the workflow data;
send a request to at least one remote support specialist based on an evaluation of the indication of noise relative to a threshold;
establish a communication link between the first computing apparatus and a second computing apparatus, which the second computing apparatus is associated with a respective remote support specialist; and
enable user interaction with and control of the machine-readable instructions, which are executing on the first computing apparatus for the EP workflow, responsive to a user input by the respective remote support specialist at the second computing apparatus.

9. The media of claim 8, wherein the instructions to compute the indication of noise include instructions to compute a confidence map for the sensors positioned on the outer surface of the patient's body, and the request is sent to the respective remote support specialist based on the confidence map.

10. The media of claim 1, wherein the instructions are further programmed to:
provide electrophysiological data based on electrophysiological signals measured from a plurality of sensors positioned on an outer surface of a patient's body;
reconstruct electrophysiological signals on a surface of interest within the patient's body based on the electrophysiological data; and
compute an indication of noise for the reconstructed electrophysiological signals on the surface of interest, wherein the request is sent to the respective remote support specialist based on the indication of noise for the reconstructed electrophysiological signals.

11. The media of claim 10, wherein the instructions to compute the indication of noise further comprise instructions calculate a physiological coherence of a graphical map, and wherein the request is sent to the respective remote support specialist based on the physiological coherence of the graphical map.

12. The media of claim 1, wherein there are a plurality of different types of maps selectable in response to a user selection input at the first computing apparatus,
wherein the request for the respective remote support specialist includes data specifying a type of map being generated, and the request is routed to the respective remote support specialist based on the type of map.

13. The media of claim 1, wherein the instructions are further programmed to:
enable an operator of the first computing apparatus to retain or discard each map that is generated in response to a user review input;
determine a number of maps retained relative to a number of maps discarded; and
trigger the request to be sent to the respective remote support specialist based on the determined number of maps.

14. The media of claim 1, wherein the instructions are further programmed to:
provide electrophysiological data based on electrophysiological signals measured from channels corresponding to respective sensors positioned on an outer surface of a patient's body and/or placed inside the patient's body;
perform signal processing on the electrophysiological data to extract one or more components from the measured electrophysiological signals; and
trigger the request to be sent to the respective remote support specialist based on the extracted one or more components.

15. The media of claim 14, wherein the instructions to perform signal processing further comprise instructions to:
extract P-waves from the electrophysiological signals;
identify baseline noise in the electrophysiological signals;
analyze one or more features in the extracted P-waves relative to the baseline noise; and
calculate an indication of quality for the respective channels based on the feature analysis, the request being triggered based on the indication quality.

16. The media of claim 1, wherein the instructions are further programmed to:
provide electrophysiological data representative of electrophysiological signals measured by one or more sensors positioned on and/or within a patient's body;
generate a phase map for at least some of the electrophysiological signals on a surface of interest;
compute a correlation between the phase map and the measured electrophysiological signals; and
trigger the request to be sent to the respective remote support specialist based on the computed correlation between the phase map and the measured electrophysiological signals.

17. The media of claim 16, wherein, in response to user input instructions received from the second computing apparatus through the communication link, the instructions on the first computing apparatus are further programmed to reconstruct electrophysiological signals on the surface of interest within the patient's body based on the electrophysiological data and geometry data, the geometry data representing spatial relationship between the sensors positioned on the patient's body and the surface of interest.

18. The media of claim 1, wherein the workflow data further comprises at least one of data indicating user stress, data indicating user performing an illogical sequence of actions, data indicating an unexpected rhythm change based on electrophysiological signals, data indicating a change to a rhythm type that the user is not an expert in, wherein the instructions are further programmed to determine the at least one support event based on the analysis of the workflow data.

19. An electrophysiology system, comprising:
a first computing apparatus comprising memory and a processor, the memory configured to store data and instructions, the processor of the first computing apparatus comprising configured to access the memory and execute the instructions to at least:
analyze workflow data for a given phase of a plurality of phases of an ongoing electrophysiology (EP) workflow implemented using the first computing apparatus;
determine at least one support event based on the analysis of the workflow data; and
send a request to at least one remote support specialist responsive to determining the at least one support event;
establish a communication link between the first computing apparatus and a second computing apparatus responsive to the request being accepted; and
the second computing apparatus being associated with a respective remote support specialist and comprising memory and a processor, the memory configured to store data and instructions for the second computing apparatus, the processor of the second computing apparatus configured to access the memory and execute the instructions to at least:
enable user interaction with and control of the machine-readable instructions, which are executing on the first computing apparatus for the EP workflow, through the communication link responsive to a user input by the respective remote support specialist at the second computing apparatus.

20. The system of claim 19, wherein the instructions on the first computing apparatus are further programmed to:
provide a graphical user interface at the second computing apparatus through the communication link, in which user inputs provided at the second computing apparatus are programmed to control the instructions and/or the workflow data at the first computing apparatus; and
transfer control to the remote support specialist for an upcoming event in the EP workflow;
wherein the instructions on the second computing apparatus are further programmed to:
receive instructions via the graphical user interface at the second computing apparatus to control the instructions and/or the workflow data at the first computing apparatus for the upcoming event.

21. The system of claim 19, wherein the workflow data includes or is generated based on at least one of electrical signal measurements from a patient, a patient data, geometry data, imaging data or another parameter of the EP workflow.

22. The system of claim 21, wherein the workflow data comprises data specifying an abnormal heart condition, and
wherein the request is sent to the respective remote support specialist in response to determining the respective remote support specialist being a subject matter expert with respect to the abnormal heart condition.

23. The system of claim 21, wherein the workflow data comprises pre-procedure imaging data acquired by an imaging modality, the instructions further programmed to compute an indication of quality based on the imaging data, and wherein the request is sent to the respective remote support specialist based on an evaluation of the indication of quality relative to a threshold.

24. The system of claim 23, wherein the instructions on the first computing apparatus to compute the indication of quality are further programmed to compute a quality score for segmentation performed on the acquired imaging data and compare the quality score relative to a segmentation quality threshold, the instructions further programmed to enable a second image segmentation performed by the respective remote support specialist at the second computing apparatus through the communication link to provide segmented image data that is stored in memory of the first computing apparatus.

25. The system of claim 19, wherein the instructions on the first computing apparatus are further programmed to:
measure electrophysiological signals from a plurality of sensors positioned on an outer surface of a patient's body to provide electrophysiological data; and
compute an indication of noise for at least some of a plurality of signal channels, each corresponding to a respective electrophysiological signal, wherein the request is sent to the respective remote support specialist based on an evaluation of the indication of noise relative to a threshold.

26. The system of claim 25, wherein the instructions to compute the indication of noise include instructions to compute a confidence map for the sensors positioned on the outer surface of the patient's body, and the request is sent to the respective remote support specialist based on the confidence map.

27. The system of claim 19, wherein the instructions on the first computing apparatus are further programmed to:
provide electrophysiological data based on electrophysiological signals measured from a plurality of sensors positioned on an outer surface of a patient's body;
reconstruct electrophysiological signals on a surface of interest within the patient's body based on the electrophysiological data; and
compute an indication of noise for the reconstructed electrophysiological signals on the surface of interest,
wherein the request is sent to the respective remote support specialist based on the indication of noise for the reconstructed electrophysiological signals.

28. The system of claim 27, wherein the instructions to compute the indication of noise further comprise instructions calculate a physiological coherence of a graphical map, and wherein the request is sent to the respective remote support specialist based on the physiological coherence of the graphical map.

29. The system of claim 19, wherein there are a plurality of different types of maps selectable in response to a selection user input at the first computing apparatus, and
wherein the request for the respective remote support specialist includes data specifying a type of map being generated, and the request is routed to the respective remote support specialist based on the type of map.

30. The system of claim 19, wherein the instructions on the first computing apparatus are further programmed to:
enable an operator of the first computing apparatus to retain or discard each map that is generated in response to a user review input;
determine a number of maps retained relative to a number of maps discarded; and
trigger the request to be sent to the respective remote support specialist based on the determined number of maps.

31. The system of claim 19, wherein the instructions on the first computing apparatus are further programmed to:

provide electrophysiological data based on electrophysiological signals measured from channels corresponding to respective sensors positioned on an outer surface of a patient's body and/or placed inside the patient's body;

perform signal processing on the electrophysiological data to extract one or more components from the measured electrophysiological signals; and trigger the request to be sent to the respective remote support specialist based on the extracted one or more components.

32. The media of claim 31, wherein the instructions to perform signal processing further comprise instructions to:

extract P-waves from the electrophysiological signals;

identify baseline noise in the electrophysiological signals;

analyze one or more features in the extracted P-waves relative to the baseline noise; and calculate an indication of quality for the respective channels based on the feature analysis, the request being triggered based on the indication quality.

33. The system of claim 19, wherein the instructions on the first computing apparatus are further programmed to:

provide electrophysiological data representative of electrophysiological signals measured by one or more sensors positioned on and/or within a patient's body;

generate a phase map for at least some of the electrophysiological signals on a surface of interest;

compute a correlation between the phase map and the measured electrophysiological signals; and trigger the request to be sent to the respective remote support specialist based on the computed correlation between the phase map and the measured electrophysiological signals.

34. The system of claim 33, wherein, in response to user input instructions received from the second computing apparatus through the communication link, the instructions on the first computing apparatus are further programmed reconstruct electrophysiological signals on the surface of interest within the patient's body based on the electrophysiological data and geometry data, the geometry data representing spatial relationship between sensors positions on the patient's body and the surface of interest.

35. The system of claim 19, wherein the workflow data further comprises at least one of data indicating user stress, data indicating user performing an illogical sequence of actions, data indicating an unexpected rhythm change based on electrophysiological data representative of measured electrophysiological signals, data indicating a change to a rhythm type that the user is not an expert in, wherein the instructions are further programmed to determine the at least one support event based on the analysis of the workflow data.

* * * * *